(12) United States Patent
Jacomb-Hood et al.

(10) Patent No.: US 6,522,643 B1
(45) Date of Patent: Feb. 18, 2003

(54) APPARATUS, METHOD, AND COMPUTER PROGRAM PRODUCTS FOR CELL-HOPPING SATELLITE COMMUNICATIONS

(75) Inventors: Anthony W. Jacomb-Hood, Yardley, PA (US); Aaron M. Dentinger, Niskayuna, NY (US); Khalil J. Maalouf, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/358,385

(22) Filed: Jul. 21, 1999

(51) Int. Cl.[7] .................................................. H04Q 7/00
(52) U.S. Cl. ....................... 370/347; 370/330; 370/331; 370/332; 370/333; 455/12.1; 455/427; 455/429; 375/132; 375/133; 375/347; 342/357
(58) Field of Search .................................. 375/132, 133, 375/267, 347; 342/457; 455/12.1, 13.1, 63, 427, 429, 450, 452; 370/319, 321, 322, 329, 330–333, 336, 337, 341, 343

(56) References Cited

U.S. PATENT DOCUMENTS

| 5,291,475 A | 3/1994 | Bruckert | 370/95.1 |
|---|---|---|---|
| 5,708,969 A | 1/1998 | Kotzin et al. | 455/34.2 |
| 5,734,983 A | 3/1998 | Faruque | 455/450 |
| 5,740,536 A | 4/1998 | Benveniste | 455/44.7 |
| 5,768,266 A * | 6/1998 | Thompson et al. | 370/321 |
| 5,790,070 A * | 8/1998 | Natarajan et al. | 342/354 |
| 6,112,094 A * | 8/2000 | Dent | 455/452 |
| 6,377,561 B1 * | 4/2002 | Black et al. | 370/330 |

* cited by examiner

Primary Examiner—William Trost
Assistant Examiner—Danh C Le
(74) Attorney, Agent, or Firm—Swidler Berlin Shereff Friedman LLP

(57) ABSTRACT

An apparatus, method, and computer program product for assigning communication resources in a beam-hopping cellular communication system. The satellite has a multiple beam antenna that covers a number of cells that is greater than the number of available beams In a preferred embodiment, the method includes the steps of selecting a frequency for each beam, computing a dwell time for each cell based on the traffic estimates for each cell and the number of available beams, and selecting a cell hopping sequence for each beam based on the dwell times and predicted inter-beam interference.

33 Claims, 7 Drawing Sheets

APPARATUS, METHOD, AND COMPUTER PROGRAM PRODUCTS FOR CELL-HOPPING SATELLITE COMMUNICATIONS

BACKGROUND OF THE INVENTION

1. Field of the Invention

The present invention relates generally to satellite communications, and more particularly to cell hopping in a satellite communications system.

2. Related Art

The current trend in cellular satellite communication systems is to divide the coverage space into hexagonal cells and assign cell frequencies based on cell separation. With a non-hopped multi-beam antenna system, each cell is then serviced by one staring beam (or two beams if the cell is dual polarized). The maximum capacity of the busiest cell is therefore limited by the capacity of one beam (or of two beams if the cell is dual polarized). Furthermore, the total number of covered cells is limited by the number of beams in the antenna system.

The cell size depends on the characteristics of the antenna, and is selected to simultaneously optimize the coverage region, the maximum coverage capacity, the signal power, and the signal to interference ratio (C/I) of each cell. A common solution is to use a tapered antenna to reduce the sidelobe (or co-channel) interference, and make the cell size the 3 to 5 dB beamwidth of the antenna. This provides a compromise between signal integrity and total coverage area.

SUMMARY OF THE INVENTION

The present invention is an apparatus, method, and computer program product for assigning communication resources in a beam-hopping cellular communication system. The satellite has a multiple beam antenna that covers a number of cells that is greater than the number of available beams. In a preferred embodiment, the method includes the steps of selecting a frequency for each beam, computing a dwell time for each cell based on the traffic estimates for each cell and the number of available beams, and selecting a cell hopping sequence for each beam based on the dwell times and predicted inter-beam interference.

Preferably the method also includes computing a dwell time percentage for each cell as the ratio of the traffic estimate for the cell to the total traffic estimate for all cells.

Preferably the method also includes defining a coverage template, the coverage template having a row for each beam and a column for each of a predetermined number of uniform time slots, and allocating a number of the time slots to each cell, the number based on the dwell time percentage for the cell. The coverage template is used to control the hopping sequence of each beam.

Preferably the method also includes selecting the cell that is not assigned to a beam and is allocated the greatest number of time slots, selecting the beam having the greatest number of unassigned time slots, assigning the selected cell to the selected beam, and repeating these steps until all of the cells are assigned to beams.

Preferably the method also includes predicting the inter-beam interference that would result from the assignment, and assigning the cell to the beam having the next greatest number of unassigned time slots when the predicted inter-beam interference exceeds a predetermined threshold.

Preferably the method also includes reducing the time slot allocation of each cell, and initializing the coverage template and re-assigning cells to beams, when a cell cannot be assigned to a beam. The time slot allocation for each cell is reduced according to its dwell time percentage.

Preferably the method also includes increasing the time slot allocation of each cell when unassigned time slots remain in the coverage template for the beam after all cells have been assigned. The time slot allocation for each cell is increased according to its dwell time percentage when the predicted inter-beam interference is below a further predetermined threshold.

Preferably the method also includes predicting the inter-beam interference based on the antenna pattern of the multiple beam antenna.

Preferably the method also includes updating the traffic estimates, modifying the dwell time for each cell based on the updated traffic estimates for each cell and the number of available beams, and modifying the cell hopping sequence for each beam based on the modified dwell times.

One advantage of the present invention is that it increases the capacity (and hence the revenue) of cellular satellite communication systems using a new technique that combines a hopped multi-beam antenna with a frequency/time assignment scheme that is adaptable to the traffic demands of the coverage cells.

Another advantage of the present invention is that it simultaneously increases the signal to interference ratio and the capacity of each cell in the coverage area.

Further features and advantages of the present invention as well as the structure and operation of various embodiments of the present invention are described in detail below with reference to the accompanying drawings.

BRIEF DESCRIPTION OF THE FIGS

The present invention will be described with reference to the accompanying drawings.

DETAILED DESCRIPTION OF THE PREFERRED EMBODIMENTS

The present invention is described in terms of the above example. This is for convenience only and is not intended to limit the application of the present invention. In fact, after reading the following description, it will be apparent to one skilled in the relevant art how to implement the present invention in alternative embodiments. A preferred embodiment is described below in terms of the satellite downlink, the present invention is equally applicable to a satellite uplink.

The present invention combines the flexibility of a hopped multi-beam antenna system with a novel frequency/time assignment technique that takes advantage of the relative traffic demand in each coverage cell. A multi-beam phased array antenna is used, and hops are controlled electronically. Each beam can therefore service multiple smaller size cells (approximately 0.5 dB beamwidth), yielding a higher capacity focus without sacrificing the size of the coverage area.

One advantage of this method is that it is driven by traffic demands. Instead of the traditional way of dividing the frequency resources uniformly in space, this method takes advantage of the non-uniform traffic demands and optimizes the frequency assignment to maximize the total system capacity. In order to maintain a specified carrier to interference ratio (C/I), a global time multiplex access scheme is superimposed on the frequency assignment to control the interference level.

The result is an FDMA/TDMA/Hopped Beam technique which emphasizes the FDMA aspect in high traffic demand regions to achieve higher capacity with minimum interference, and emphasizes the TDMA aspect in low traffic demand areas to achieve the same relative capacity with minimum frequency resources. Hopping of the beams makes this scheme feasible.

When the beam-hopping assignments are fixed in a "coverage template", the coverage can be implemented using a software script that digitally commands each beam in the antenna system to be steered to its designated coverage cell at a specified time. A process that automatically generates the coverage template has been developed. The process takes into consideration the downtime introduced by hopping (steering and terminal synchronization), and it insures C/I compliance in each cell and for all time slots. The process also matches the maximum capacity of each cell to the overall cell traffic demand profile. This allows all the cells in the system to grow at similar rates without saturation, therefore maximizing the system revenue over time.

Figure 1:
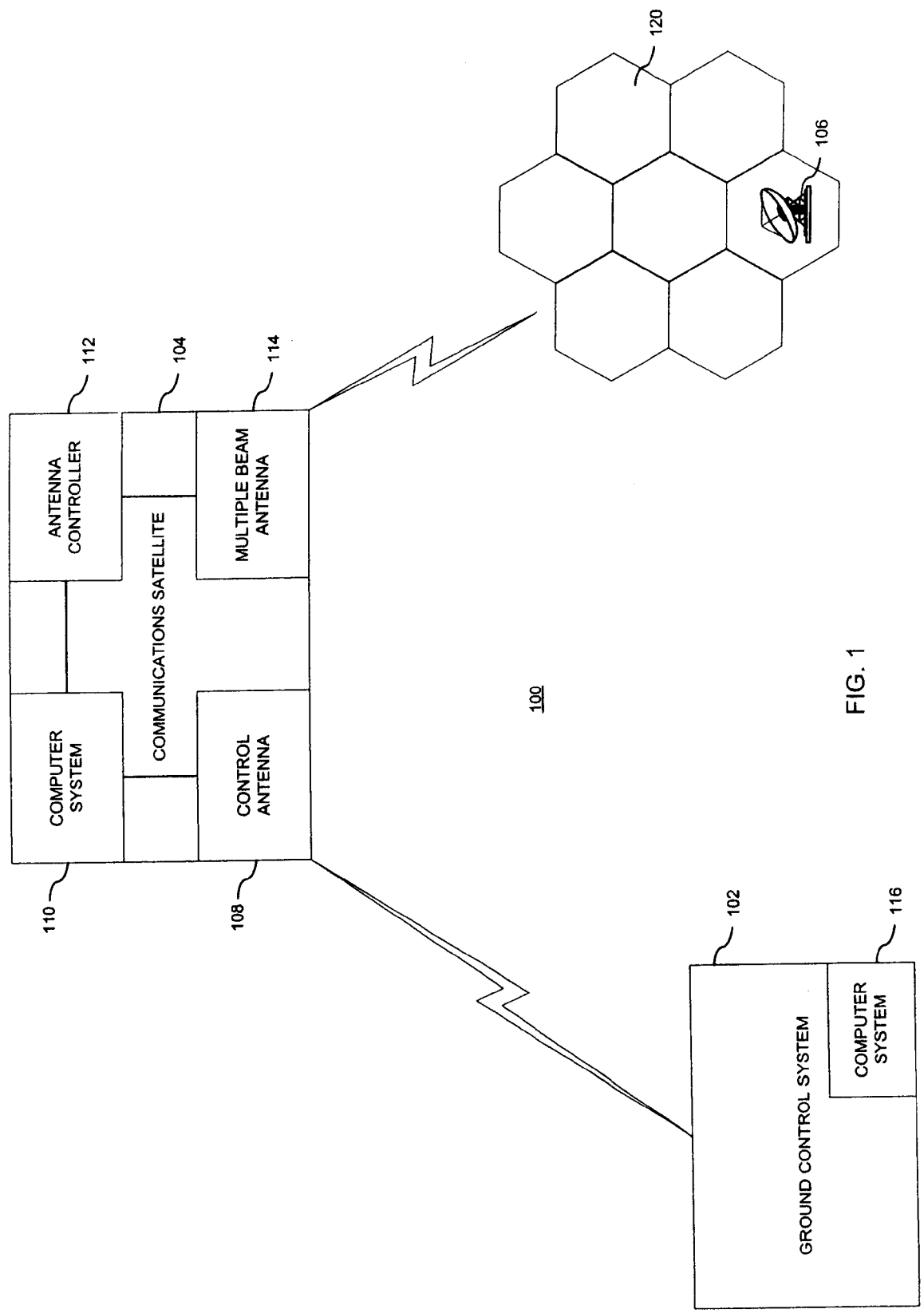
FIG. 1 is a block diagram of a satellite communication system in which the present invention is useful.

FIG. 1 is a block diagram of a satellite communication system 100 in which the present invention is useful. Satellite system 100 includes a ground control system 102, a communications satellite 104, and a cellular customer 106. Communications satellite 104 includes a control antenna 108, a computer system 110, an antenna controller 112, and a multiple beam antenna 114. In a preferred embodiment, multiple beam antenna 114 includes separate transmit (downlink) and receive (uplink) antennas. Communications satellite 104 communicates with ground control system 102 using its control antenna 108. Ground control system 102 includes a computer system 116. Communications satellite 104 also communicates with a plurality of cellular customers 106 in a coverage area that includes a plurality of cells 120.

Figure 2:
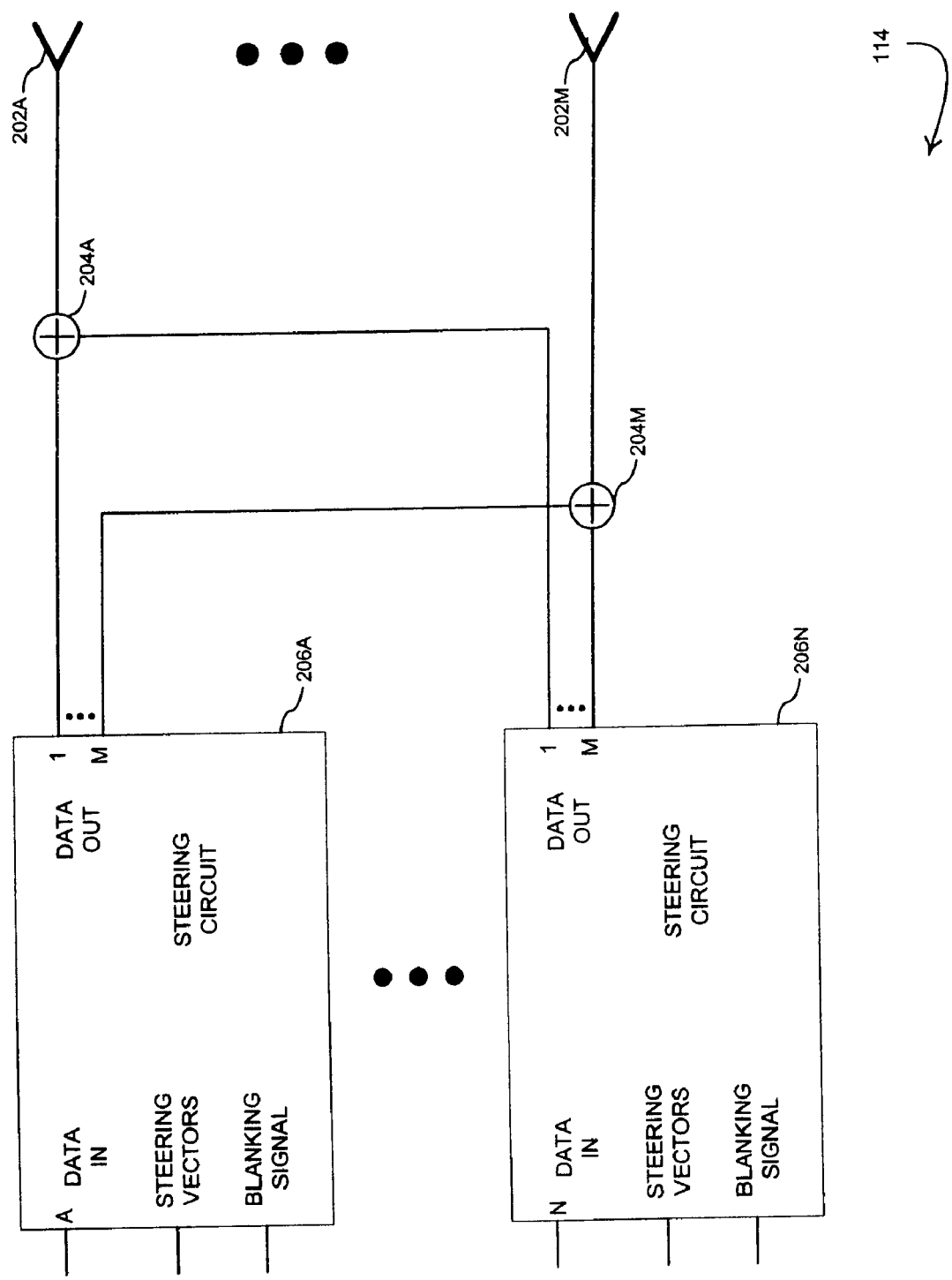
FIG. 2 is a circuit block diagram depicting details of antenna controller and multiple beam antenna.

FIG. 2 is a circuit block diagram depicting details of multiple beam antenna 114. In one embodiment, antenna 114 comprises two active phased arrays with N beams each. Such antennas are well-known. It is desirable to maintain a predetermined C/I at any receiver on the ground.

Referring to FIG. 2, multiple beam antenna 114 includes a plurality M of radiating elements 202A through 202M. Each element 202 is fed by a combiner 204 that receives data signals from a plurality N of steering circuits 206A through 206N. Each steering circuit 206 receives a data signal for one of the N beams, a set of steering vectors, and a blanking signal. The steering vectors and blanking signal control the hopping of the beams from cell to cell. The steering vectors control the direction of the beam.

The blanking signal prevents transmission when the beam is in motion between cells. Each time a beam hops to a new cell, a finite synchronization time between the satellite and the ground terminals of the new cell is required before communication data can be transmitted. In a preferred embodiment, a predetermined synchronization period is used to establish a reliable link.

Each steering circuit 206 produces M data signals. Each of the data signals is fed to one of combiners 204A through 204M.

Figure 3:
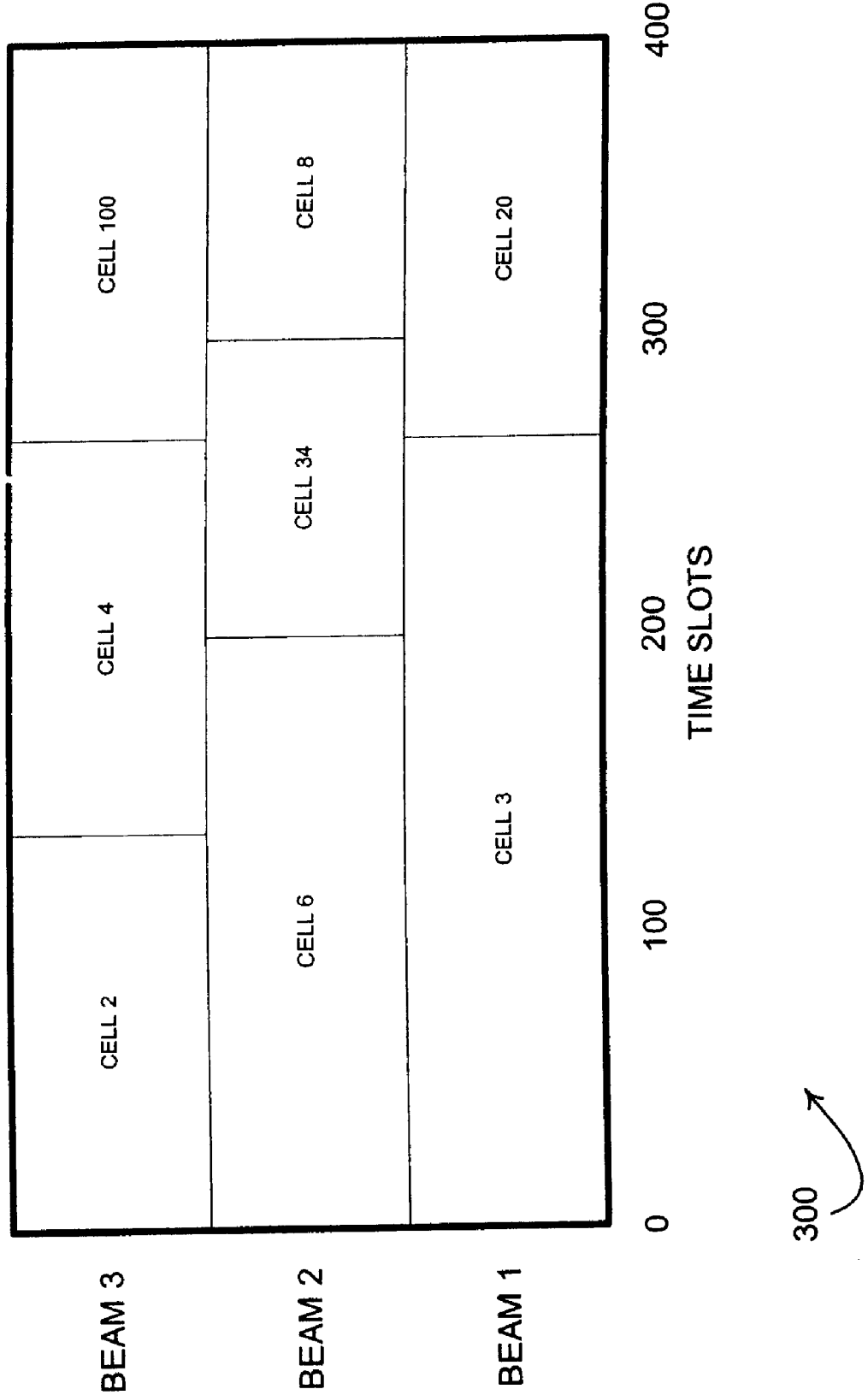
FIG. 3 depicts a coverage template according to the present invention.

FIG. 3 depicts an exemplary coverage template 300 according to the present invention. Coverage template 300 is populated by making assignments between cells and beams according to the method of the present invention, which is discussed in detail below. In one embodiment, coverage template 300 is produced by computer system 116 within ground control system 102, and is uplinked to satellite 104 via control antenna 108. In another embodiment, coverage template 300 is produced by on-board computer system 110. Coverage template 300 is used to select pre-calculated steering vectors, and to generate the timing for blanking signals, for steering circuits 206, and to route the appropriate data to each steering circuit 206. In a preferred embodiment, this routing is directed by computer system 110 within communications satellite 104.

Referring to FIG. 3, coverage template 300 depicts a correspondence between the available beams and the required cells for a template duration of 400 time slots. In a preferred embodiment, the duration of the time slot is on the order of a millisecond. In a preferred embodiment, the transmitted and received data streams of the satellite are divided temporally into frames. The cell-to-beam correspondence for each frame is determined by coverage template 300. Referring to FIG. 3, beam 1 covers cell 3 for the first 250 time slots of each frame. Then, beam 1 is moved to cell 20, and covers cell 20 for the remaining 150 time slots of the frame. Beam 2 covers cell 6 for the first 200 time slots, cell 34 for the next 100 time slots, and cell 8 for the final 100 time slots of each frame. Beam 3 covers cell 2 for the first 133 time slots, cell 4 for the next 133 time slots, and cell 100 for the final 134 time slots of each frame.

Figure 4:
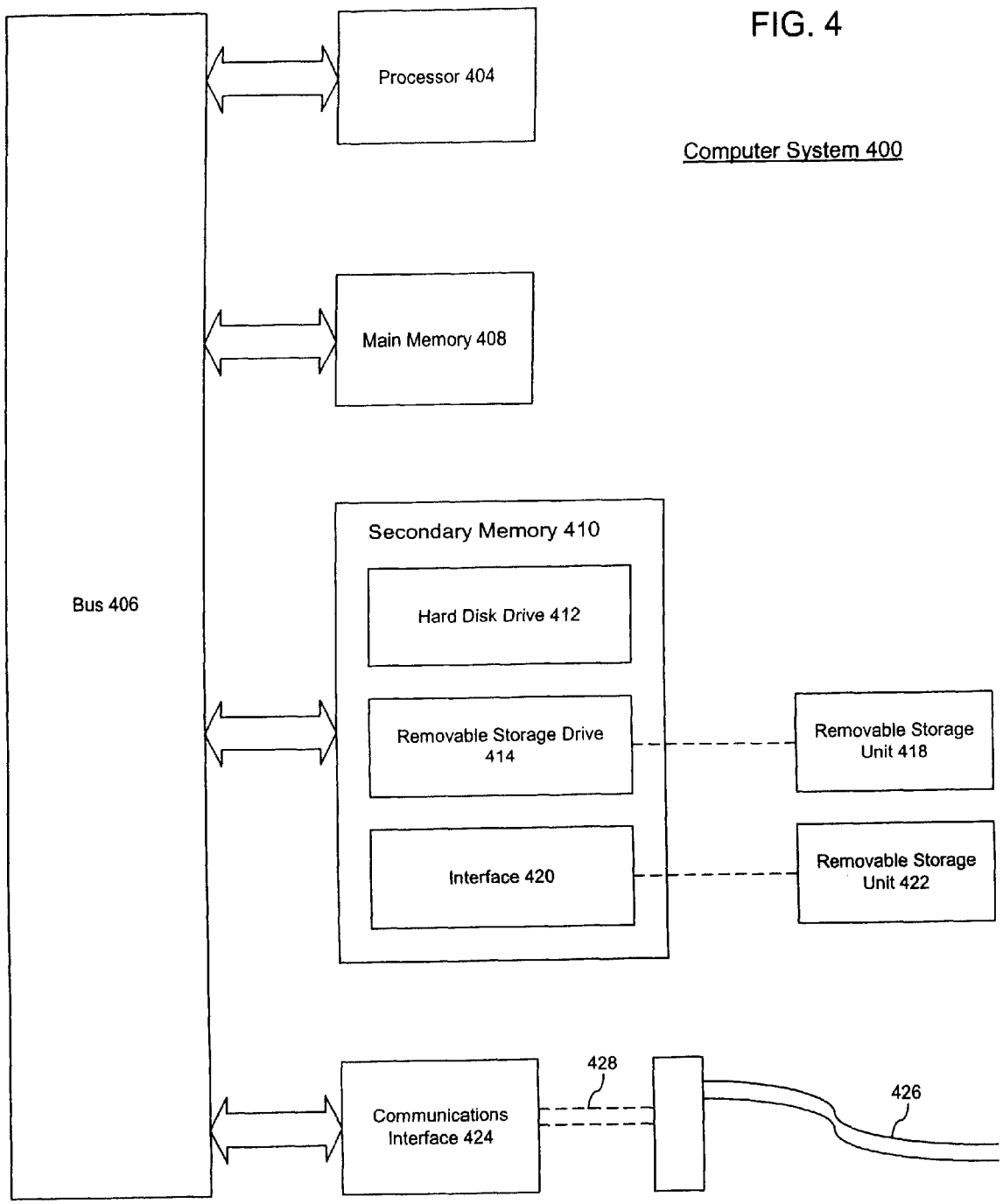
FIG. 4 depicts an example computer system capable of carrying out the functionality of the present invention.

The present invention may be implemented using hardware, software or a combination thereof and may be implemented in a computer system or other processing system. In fact, in one embodiment, the invention is directed toward one or more computer systems capable of carrying out the functionality described herein. An example computer system 400 is shown in FIG. 4. The computer system 400 includes one or more processors, such as processor 404. The processor 404 is connected to a communication bus 406. Various software embodiments are described in terms of this example computer system. After reading this description, it will become apparent to a person skilled in the relevant art how to implement the invention using other computer systems and/or computer architectures.

Computer system 400 also includes a main memory 408, preferably random access memory (RAM), and can also include a secondary memory 410. The secondary memory 410 can include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well known manner. Removable storage unit 418, represents a floppy disk, magnetic tape, optical disk, etc. which is read by and written to by removable storage drive 414. As will be appreciated, the removable storage unit 418 includes a computer usable storage medium having stored therein computer software and/or data.

In alternative embodiments, secondary memory 410 may include other similar means for allowing computer programs or other instructions to be loaded into computer system 400. Such means can include, for example, a removable storage unit 422 and an interface 420. Examples of such include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 418 to computer system 400.

Computer system 400 can also include a communications interface 424. Communications interface 424 allows software and data to be transferred between computer system 400 and external devices. Examples of communications interface 424 can include a modem, a network interface (such as an Ethernet card), a communications port, a PCM-CIA slot and card, etc. Software and data transferred via communications interface 424 are in the form of signals which can be electronic, electromagnetic, optical or other signals capable of being received by communications interface 424. These signals 426 are provided to communications interface 424 via a channel 428. This channel 428 carries signals 426 and can be implemented using wire or cable, fiber optics, a phone line, a cellular phone link, an RF link and other communications channels.

In this document, the terms "computer program medium" and "computer usable medium" are used to generally refer to media such as removable storage device 418, a hard disk installed in hard disk drive 412, and signals 426. These computer program products are means for providing software to computer system 400.

Computer programs (also called computer control logic) are stored in main memory 408 and/or secondary memory 410. Computer programs can also be received via communications interface 424. Such computer programs, when executed, enable the computer system 400 to perform the features of the present invention as discussed herein. In particular, the computer programs, when executed, enable the processor 404 to perform the features of the present invention. Accordingly, such computer programs represent controllers of the computer system 400.

In an embodiment where the invention is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

Figure 5:
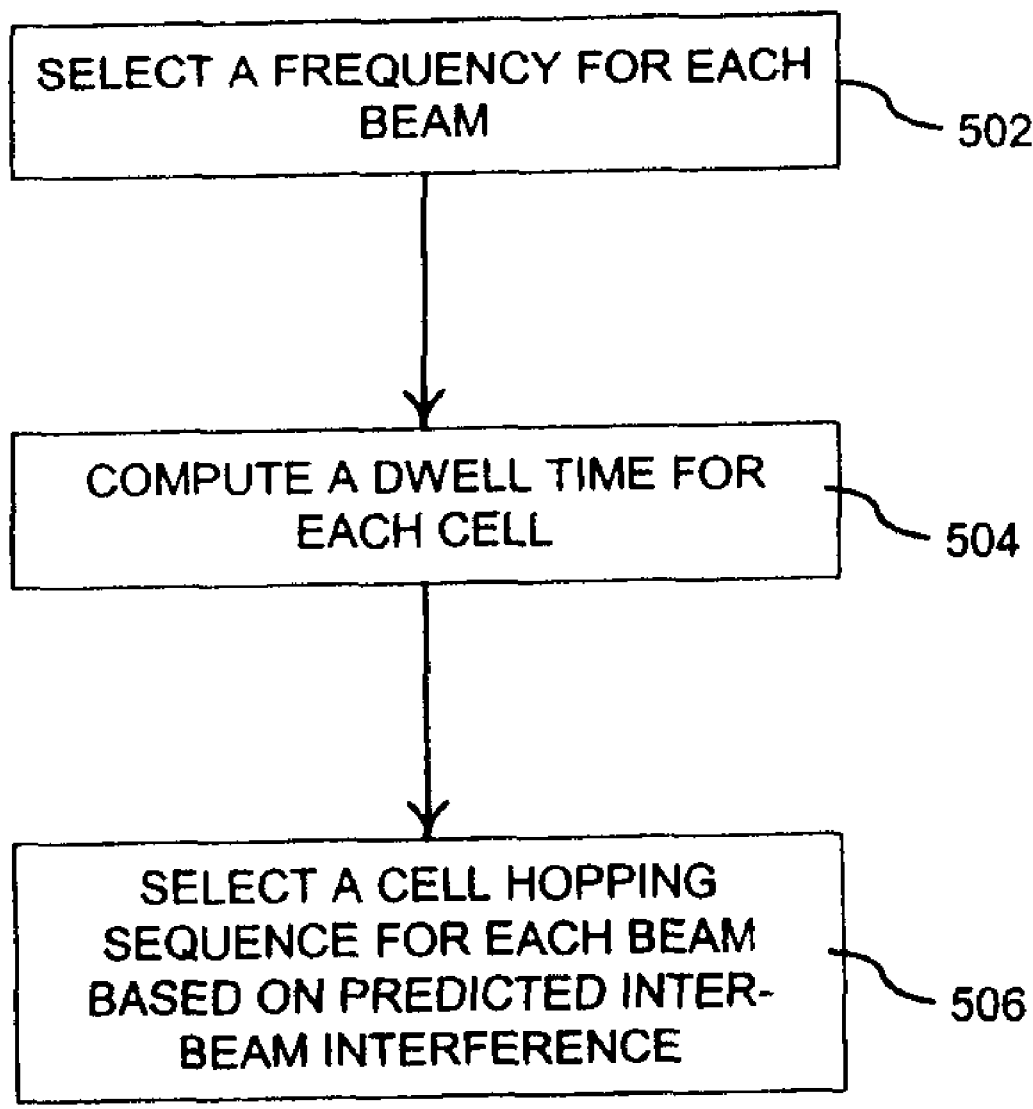
FIG. 5 is a flow chart depicting the operation of the present invention in assigning cells to beams to create a coverage template according to a preferred embodiment.

FIG. 5 is a flow chart depicting the operation of the present invention in assigning cells to beams to create a coverage template according to a preferred embodiment. In a preferred embodiment, the number of cells is greater than the number of available beams. First, a frequency is selected for each available beam at 502. In a preferred embodiment, this selection is made so that every frequency is assigned to approximately the same number of beams. Then, a dwell time is computed for each cell at 504. The dwell time determines how much time within each frame each cell should be illuminated. Then a cell-hopping sequence is selected for each beam at 506. The cell-hopping sequences are selected based on predicted inter-beam interference.

Figure 6:
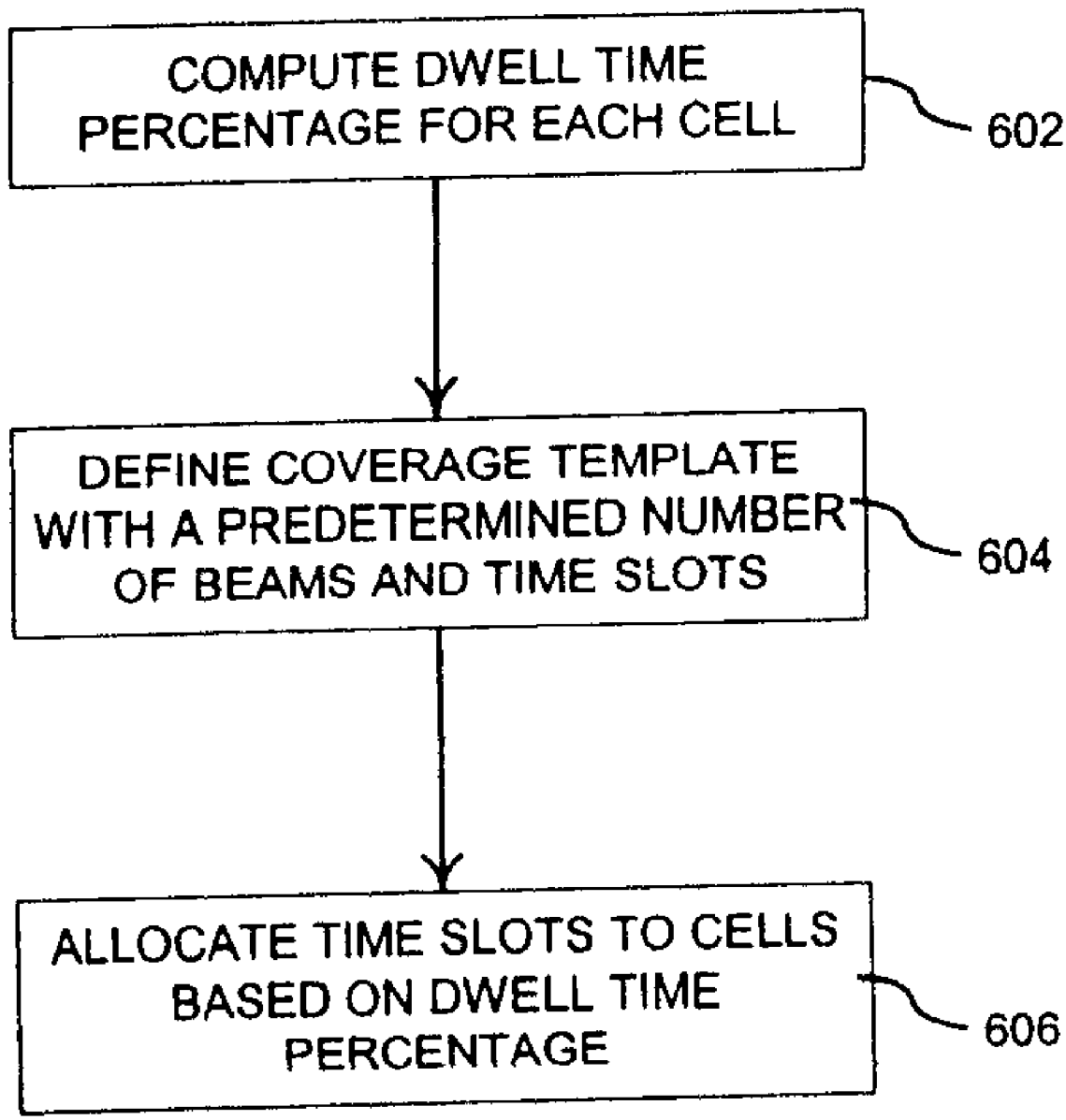
FIG. 6 is a flow chart depicting the operation of the present invention according to a preferred embodiment in computing a dwell time for each cell according to a preferred embodiment.

FIG. 6 is a flow chart depicting the operation of the present invention according to a preferred embodiment in computing a dwell time for each cell according to a preferred embodiment. This operation corresponds to step 504 of FIG. 5. First, a dwell time percentage is computed for each cell. This percentage is computed based on the traffic estimates for each cell. The dwell time percentage for a cell is the ratio of the traffic estimate for that cell to the total traffic estimate for all cells to be covered by the satellite during the frame.

Next, a coverage template is defined at 604. The coverage template is defined to include a predetermined number of beams and time slots. Referring to FIG. 3, the predetermined number of time slots in exemplary coverage template 300 is 400. Of course, at this point in the process, the coverage template is empty. That is, no beam-to-cell assignments have been made. Next, the time slots are allocated to cells based on their dwell time percentage at 606. In a preferred embodiment, the number of time slots to be allocated to a cell is computed by multiplying the dwell time percentage for the cell by the total number of time slots in the coverage template. In the example of FIG. 3, cell 6 has been allocated 200 time slots. Note that, at this point in the process, cell 6 has not yet been assigned to a beam.

Figure 7:
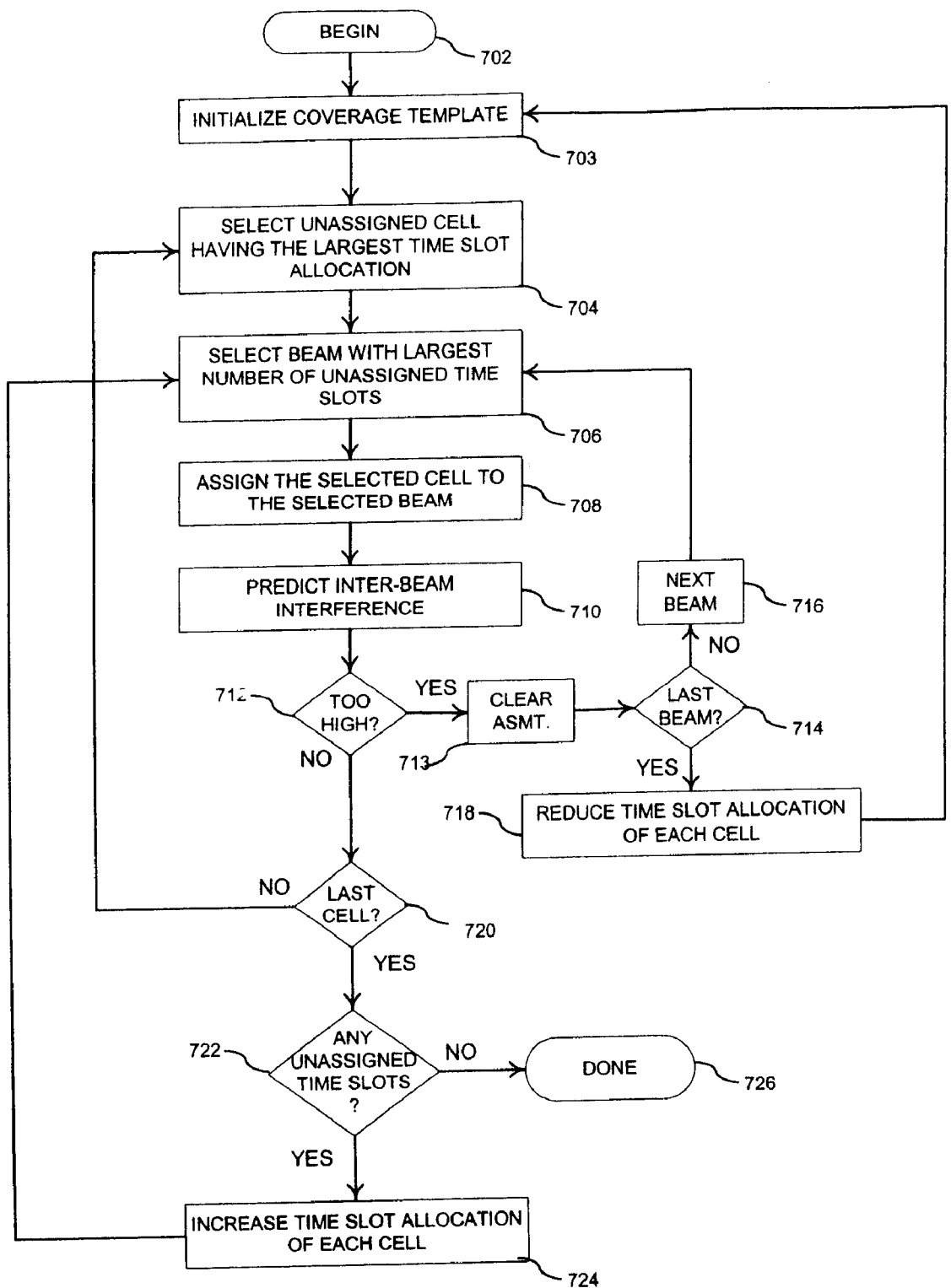
FIG. 7 is a flow chart depicting the operation of the present invention according to a preferred embodiment in selecting a cell-hopping sequence for each beam.

FIG. 7 is a flow chart depicting the operation of the present invention according to a preferred embodiment in selecting a cell-hopping sequence for each beam. This operation corresponds to step 506 of FIG. 5. The process begins at 702. The coverage template is initialized at 703. Initialization of the coverage template is completed by clearing any cell-to-beam assignments in the coverage template. Next, the unassigned cell having the largest time slot allocation is selected at 704. In the example of FIG. 3, cell 3 has been assigned 250 time slots, and so has the largest time slot allocation. Therefore, cell 3 is selected at 704.

Next, the beam with the largest number of unassigned time slots is selected at 706. In the example of FIG. 3, no time slots have been assigned to a particular cell. Therefore, the first beam, beam 1, is selected at 706. The selected cell is assigned to the selected beam at 708. In the example of FIG. 3, cell 3 is assigned to beam 1. In a preferred embodiment, the assignment is made as near the beginning of the coverage template as possible. Therefore, cell 3 is assigned to beam 1 for time slots 0 through 250.

An important feature of the present invention is that the cell-to-beam assignments are made so as to minimize interference. In a preferred embodiment, the inter-beam interference is checked for each beam-to-cell assignment as the assignments are made. Therefore, the inter-beam interference of coverage template 300 is predicted at 710, and checked at 712.

In a preferred embodiment, this checking involves comparing the predicted inter-beam interference to a predetermined threshold. To simplify determination of the predicted inter-beam interference, it is assumed that the side-lobe interference contributes approximately half of the total inter-beam interference. Therefore, only the sidelobe interference is predicted. The threshold is selected accordingly. Methods for predicting such interference are well-known.

If the predicted inter-beam interference is too high, then the assignment is removed at 713 because the cell must be reassigned. That is, the cell must be assigned to another beam. If another beam has sufficient time slots available to support the assignment, then that beam is selected at 716 and the process repeats at 706. However, if no beam is available, then the time slot allocation to each cell is reduced at 718, and the process of FIG. 7 begins again at 706.

Returning to 712, the process continues with the next cell-to-beam assignment at 704. When all of the cells have been successfully assigned to beams at 720, the process checks to determine whether any time slots within the coverage template remain unassigned. If all of the time slots have been assigned to cells, then the process is complete at 726. If time slots remain unassigned within the coverage template however, then the process increases the time slot allocations of each cell at 724, and the process of FIG. 7 begins again at 703.

Occasionally, the traffic estimates for the cells will change, or are refined. When this occurs, the present invention can be used to modify the coverage template to accommodate the updated traffic estimates. In a preferred embodiment, the dwell time for each cell is modified based on the updated traffic estimates for each cell and the number of available beams, and the cell hopping sequence for each beam is modified based on the modified dwell times.

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. An apparatus for assigning communication resources in a beam-hopping cellular communication system having a multiple beam antenna covering a number of cells that is greater than the number of available beams, the apparatus comprising:
   means for selecting a frequency for each beam; and
   means for computing a dwell time for each cell based on the traffic estimates for each cell and the number of available beams; and
   means for selecting a cell hopping sequence for each beam based on the dwell times and predicted inter-beam interference.

2. The apparatus of claim 1, wherein said means for computing comprises:
   means for computing a dwell time percentage for each cell as the ratio of the traffic estimate for the cell to the total traffic estimate for all cells.

3. The apparatus of claim 2, wherein said means for computing further comprises:
   means for defining a coverage template, the coverage template having a row for each beam and a column for each of a predetermined number of uniform time slots; and
   means for allocating a number of the time slots to each cell, the number based on the dwell time percentage for the cell.

4. The apparatus of claim 3, wherein said means for selecting comprises:
   means for selecting the cell that is not assigned to a beam and is allocated the greatest number of time slots;
   means for selecting the beam having the greatest number of unassigned time slots; and
   means for assigning the selected cell to the selected beam.

5. The apparatus of claim 4, wherein said means for assigning comprises:
   means for predicting the inter-beam interference that would result from the assignment; and
   means for assigning the cell to the beam having the next greatest number of unassigned time slots when the predicted inter-beam interference exceeds a predetermined threshold.

6. The apparatus of claim 5, wherein said means for assigning further comprises:
   means for reducing the time slot allocation of each cell and initializing the coverage template when a cell cannot be assigned to a beam.

7. The apparatus of claim 6, wherein said means for reducing comprises:
   means for reducing the time slot allocation for each cell according to its dwell time percentage.

8. The apparatus of claim 5, wherein said means for assigning further comprises:
   means for increasing the time slot allocation, of each cell when unassigned time slots remain in the coverage template for the beam after all cells have been assigned.

9. The apparatus of claim 8, wherein said means for increasing comprises:
   means for increasing the time slot allocation for each cell according to its dwell time percentage when the predicted inter-beam interference is below a further predetermined threshold.

10. The apparatus of claim 5, wherein said means for predicting comprises:
    means for predicting the inter-beam interference based on the antenna pattern of the multiple beam antenna.

11. The apparatus of claim 1, further comprising:
    means for updating the traffic estimates;
    means for modifying the dwell time for each cell based on the updated traffic estimates for each cell and the number of available time slots; and
    means for modifying the cell hopping sequence for each beam based on the modified dwell times.

12. A method for assigning communication resources in a beam-hopping cellular communication system having a multiple beam antenna covering a number of cells that is greater than the number of available beams, the method comprising:
    a) selecting a frequency for each beam;
    b) computing a dwell time for each cell based on the traffic estimates for each cell and the number of available beams; and
    c) selecting a cell hopping sequence for each beam based on the dwell times and predicted inter-beam interference.

13. The method of claim 12, wherein step b) comprises:
    computing a dwell time percentage for each cell as the ratio of the traffic estimate for the cell to the total traffic estimate for all cells.

14. The method of claim 13, wherein step b) further comprises:
    b1) defining a coverage template, the coverage template having a row for each beam and a column for each of a predetermined number of uniform time slots; and
    b2) allocating a number of the time slots to each cell, the number based on the dwell time percentage for the cell.

15. The method of claim 14, wherein step c) comprises:
c1) selecting the cell that is not assigned to a beam and is allocated the greatest number of time slots;
c2) selecting the beam having the greatest number of unassigned time slots;
c3) assigning the selected cell to the selected beam; and
c4) repeating step c1), c2) and c3) until all of the cells are assigned to beams.

16. The method of claim 15, wherein step c3) comprises:
predicting the inter-beam interference that would result from the assignment; and
assigning the cell to the beam having the next greatest number of unassigned time slots when the predicted inter-beam interference exceeds a predetermined threshold.

17. The method of claim 16, wherein step c3) further comprises:
reducing the time slot allocation of each cell, initializing the coverage template, and repeating steps c1), c2), c3) and c4) when a cell cannot be assigned to a beam.

18. The method of claim 17, wherein the reducing step comprises:
reducing the time slot allocation for each cell according to its dwell time percentage.

19. The method of claim 16, wherein step c3) further comprises:
increasing the time slot allocation of each cell and repeating steps c1), c2), c3) and c4) when unassigned time slots remain in the coverage template for the beam after all cells have been assigned.

20. The method of claim 19, wherein the increasing step comprises:
increasing the time slot allocation for each cell according to its dwell time percentage when the predicted inter-beam interference is below a further predetermined threshold.

21. The method of claim 16, wherein the predicting step comprises:
predicting the inter-beam interference based on the antenna pattern of the multiple beam antenna.

22. The method of claim 12, further comprising:
d) updating the traffic estimates;
e) modifying the dwell time for each cell based on the updated traffic estimates for each cell and the number of available time slots; and
f) modifying the cell hopping sequence for each beam based on the modified dwell times.

23. A computer program product for assigning communication resources in a beam-hopping cellular communication system having a multiple beam antenna covering a number of cells that is greater than the number of available beams, said computer program product comprising a computer usable medium having computer readable program code means embodied in said medium, said computer readable program code means comprising:
a first computer readable program code means for causing a computer to select a frequency for each beam;
a second computer readable program code means for causing a computer to compute a dwell time for each cell based on the traffic estimates for each cell and the number of available beams; and
a third computer readable program code means for causing a computer to select a cell hopping sequence for each beam based on the dwell times and predicted inter-beam interference.

24. The computer program product of claim 23, wherein said second computer readable program code means comprises:
computer readable program code means for causing a computer to compute a dwell time percentage for each cell as the ratio of the traffic estimate for the cell to the total traffic estimate for all cells.

25. The computer program product of claim 24, wherein said second computer readable program code means further comprises:
computer readable program code means for causing a computer to define a coverage template, the coverage template having a row for each beam and a column for each of a predetermined number of uniform time slots; and
computer readable program code means for causing a computer to allocate a number of the time slots to each cell, the number based on the dwell time percentage for the cell.

26. The computer program product of claim 25, wherein said third computer readable program code means further comprises:
computer readable program code means for causing a computer to select the cell that is not assigned to a beam and is allocated the greatest number of time slots;
computer readable program code means for causing a computer to select the beam having the greatest number of unassigned time slots; and
computer readable program code means for causing a computer to assign the selected cell to the selected beam.

27. The computer program product of claim 26, wherein said computer readable program code means for causing a computer to assign comprises:
computer readable program code means for causing a computer to predict the inter-beam interference that would result from the assignment; and
computer readable program code means for causing a computer to assign the cell to the beam having the next greatest number of unassigned time slots when the predicted inter-beam interference exceeds a predetermined threshold.

28. The computer program product of claim 27, wherein said computer readable program code means for causing a computer to assign the selected cell to the selected beam further comprises:
computer readable program code means for causing a computer to reduce the time slot allocation of each cell and initializing the coverage template when a cell cannot be assigned to a beam.

29. The computer program product of claim 28, wherein said computer readable program code means for causing a computer to reduce further comprises:
computer readable program code means for causing a computer to reduce the time slot allocation for each cell according to its dwell time percentage.

30. The computer program product of claim 27, wherein said computer readable program code means for causing a computer to assign the selected cell to the selected beam further comprises:
computer readable program code means for causing a computer to increase the time slot allocation of each cell when unassigned time slots remain in the coverage template for the beam after all cells have been assigned.

31. The computer program product of claim 30, wherein said computer readable program code means for causing a computer to increase comprises:

computer readable program code means for causing a computer to increase the time slot allocation for each cell according to its dwell time percentage when the predicted inter-beam interference is below a further predetermined threshold.

32. The computer program product of claim 27, wherein said computer readable program code means for causing a computer to predict comprises:

computer readable program code means for causing a computer to predict the inter-beam interference based on the antenna pattern of the multiple beam antenna.

33. The computer program product of claim 23, wherein said computer readable program code means further comprises:

computer readable program code means for causing a computer to update the traffic estimates;

computer readable program code means for causing a computer to modify the dwell time for each cell based on the updated traffic estimates for each cell and the number of available time slots; and computer readable program code means for causing a computer to modify the cell hopping sequence for each beam based on the modified dwell times.

* * * * *